United States Patent [19]

Nielinger et al.

[11] Patent Number: 4,673,728

[45] Date of Patent: Jun. 16, 1987

[54] PROCESS FOR THE PRODUCTION OF COPOLYAMIDE FROM AROMATIC DICARBOXYLIC ACIDS, ADIPIC ACID AND HEXAMETHYLENE DIAMINE

[75] Inventors: Werner Nielinger; Hermann Brinkmeyer; Rudolf Binsack; Ludwig Bottenbruch, all of Krefeld; Heinz-Josef Füllmann, Leichlingen, all of Fed. Rep. of Germany

[73] Assignee: Bayer Aktiengesellschaft, Leverkusen, Fed. Rep. of Germany

[21] Appl. No.: 830,269

[22] Filed: Feb. 18, 1986

[30] Foreign Application Priority Data

Feb. 26, 1985 [DE] Fed. Rep. of Germany ....... 3506656

[51] Int. Cl.$^4$ ............................................. C08G 69/26
[52] U.S. Cl. .................................... 528/339; 528/335; 528/347
[58] Field of Search ................................ 528/339, 335

[56] References Cited

U.S. PATENT DOCUMENTS

| | | | |
|---|---|---|---|
| 3,516,972 | 6/1970 | Wolfes et al. | 528/339 |
| 4,218,509 | 8/1980 | Edgar et al. | 528/339 |
| 4,238,603 | 12/1980 | Chapman et al. | 528/339 |
| 4,246,395 | 1/1981 | Mortimer | 528/339 |

FOREIGN PATENT DOCUMENTS 121984 10/1984 European Pat. Off. ............ 528/339

*Primary Examiner*—Harold D. Anderson
*Attorney, Agent, or Firm*—Connolly & Hutz

[57] ABSTRACT

A process for the production of copolyamides from aromatic dicarboxylic acids, adipic acid, and hexamethylene diamine having from 30 to 51.5% by weight of units of the hexamethylene adipic acid amide, the monomers being precondensed at at least 250° C. and under a pressure of at least 35 bars and the polycondensation being conducted in a conventional manner to completion.

5 Claims, No Drawings

PROCESS FOR THE PRODUCTION OF COPOLYAMIDE FROM AROMATIC DICARBOXYLIC ACIDS, ADIPIC ACID AND HEXAMETHYLENE DIAMINE

The invention provides processes for the production of copolyamides from aromatic dicarboxylic acids, adipic acid and hexamethylene diamine having from 30 to 51.5% by weight of units of the hexamethylene adipic acid amide, the monomers being precondensed at at least 250° C. and under a pressure of 1–40 bars and the polycondensation being conducted in a conventional manner to completion.

Polyamides such as polyamide-6 and polyamide-66 are characterised by great hardness, rigidity and dimensional stability under heat. They are resistant to abrasion and wear and resistant to a large number of chemicals. The polyamides thus find many applications in the production of technical mouldings, for example in the motor car industry.

For many areas of use, it is necessary, however, to also subject the mouldings to relatively high temperatures. This is especially applicable for the reinforced products. Particular copolyamides from adipic acid, terephthalic acid and hexamethylene diamine satisfy this demand. The production thereof is described in DE-PS No. 929 151 and the use thereof for the production of films is described in European Patent Application No. 34 757; moreover, in German Offenlegungsschrift No. 29 27 018, the use thereof as glass fibre-reinforced material for extruding profiles is published. The softening point of copolyamides which contain more than 18% by weight of hexamethylene terephthalic amide units increases according to British Pat. No. 11 14 451 to over 265° C., against which in DP No. 929 151 a melting point of 249° C. is given for copolyamides having 20% by weight of hexamethylene terephthalic amide units. In DOS No. 1 669 453, polyamides from adipic acid, terephthalic acid and hexamethylene diamine are described which can be used as a nucleation agent for polyamide fibres. Owing to their high melting point, these copolyamides can only be produced with difficulty according to the conventional processes in an autoclave. In order to improve the productibility of copolyamides from adipic acid, terephthalic acid and hexamethylene diamine, the addition of sulphonic amides before or during polycondensation is recommended in DOS No. 1 745 076. High-melting copolyamides from terephthalic acid, isophthalic acid, adipic acid and hexamethylene diamine, trimethyl hexamethylene diamine as well as further diamines are described in European Offenlegungschriften Nos. 121 983, 121 984, 121 985, 121 688 and 123 377. The production thereof takes place, starting from the salt mixtures, under addition of preferably from 13 to 17% of water in a multi-stage process, whereby the water is evaporated off at very high temperatures in a spray evaporator. The final condensation of the obtained preliminary condensation product takes place in a double shaft screw. The process is costly and difficult to carry out. The necessary high temperatures can result in the polyamide being damaged. The process according to DOS No. 33 21 579 and DOS No. 33 21 581 is also little suited to the production of the polyamides according to the invention, since the melt of these products may solidify prematurely under the given conditions and the polyamides cannot be produced to perfection.

Particularly suitable copolyamides are those having greater than 35% by weight of hexamethylene terephthalic anide units since the melting point thereof in relation to that of poly(hexamethylene adipic amide) is clearly elevated and the freezing point thereof is above 75° C. The properties of these copolyamides produced according to the prior art, however, fluctuate such that no reproducible products are obtained according to the known processes. This is particularly the case when preliminary condensation is carried out according to the teaching of the prior art at temperatures around 220° C. and with long heating periods, as are necessary in the production in an autoclave. Thus, copolyamides of equal gross composition differ, according to the production conditions, not only by more than 10° C. in the melting point, but also by more than 5° C. in the freezing point. The copolyamides produced according to the prior art are moreover not completely soluble in formic acid. These insoluble parts worsen the strength properties of the copolyamide since they may result in the formation of cracks during impact stress.

It has surprisingly now been found that copolyamides with improved properties are produced reproducably from adipic acid, an aromatic dicarboxylic acid, preferably terephthalic acid and optionally isophthalic acid and hexamethylene diamine, when the aqueous solution of monomers for the preliminary condensation is heated very rapidly to a temperature of at least 250° C., preferably however, to at least 260° C. and the obtained preliminary condensation product is often condensed in the solid phase according to known processes.

The invention thus provides processes for the production of homogeneous polyamides which are completely soluble in formic acid, from adipic acid, terephthalic acid and optionally isophthalic acid and hexamethylene diamine, wherein a 40 to 70, preferably 45 to 65% aqueous solution of monomers is heated in less than 15 min, preferably within from 1 to 10 min under a pressure of at least 35 bars to at least 250° C., preferably to from 260° to 360° C. and the water is distilled off in one or more stages at temperatures of from 260° to 360° C. under a pressure of from 1 to 40 bars, preferably from 1 to 35 bars, whereby a preliminary condensation product with a relative viscosity of from 1.2 to 2.5, preferably from 1.6 to 2.4 is obtained which condensation is finished in a known manner under standard pressure.

For the production of the copolyamides, a device as described in U.S. Pat. No. 2,361,717, FIG. 1, for example, is suitable.

The copolyamides according to the invention should preferably be constructed from 30 to 51.5% by weight of hexamethylene adipic amide units and from 70 to 48.5% by weight of units of hexamethylene amide/isophthalic amide units, of which the terephthalic amide proportion should be from 48.5 to 60, preferably from 48.5 to 55% by weight.

The copolyamides which are produced according to the process of the invention are entirely soluble in formic acid. They have a higher glass temperature compared with the products produced according to the known processes and improved strength and reduced water absorption. They can be processed on commercial machines such as injection moulding machines or extruders.

The conventional additives and auxiliaries such as lubricants and release agents, as well as stabilizers and fire protection agents can be added to the copolyamides produced according to the invention, moreover fillers, particularly glass fibres in quantities of from 10 to 60% by weight, based on the total mixture. Further fillers and reinforcing materials are micro-glass balls, chalk, quartz, such as Novaculit and silicates such as asbestos, feldspar, mica, talcum, wollastonite as well as kaolin in calcinated and non-calcinated form. The following are also used: dyes and pigments, particularly colour blacks and/or nigrosine bases, moreover impact-resistance modifiers, for example based on copolymers of ethylene, poly(meth)acrylates and grafted polybutadienes.

The copolyamides are particularly suitable for the production of mouldings of many different types such as injection moulding parts, plates, films and fibres. They are particularly used for the production of machine components, technical equipment and in motor car construction. A further area of use is the electrical sector. They can particularly be processed for the production of films and chemical-resistant parts, such as containers, which are resistant to oxidation at relatively high temperatures.

The apparatus described in U.S. Pat. No. 2,361,717, is used for the continuous production of the copolyamide according to the examples.

EXAMPLE 1

A 50% aqueous salt solution which consists of 15.38 parts of terephthalic acid, 1.17 parts of isophthalic acid, 12.20 parts of adipic acid and 22.10 parts of hexamethylene diamine (4 mol% are contained therein in excess), is pumped out of a receiver heated to 95° C. under a pressure of 30 bars through a serpentine tube heated to 300° C. with a length of 6 m and with a diameter of 4 mm. The flow rate of salt solution is 1000 g/h. The reaction mixture then flows through a further serpentine tube, 6 m in length and 4 mm in diameter, which is heated to 340° C. A drop in pressure then takes place via a valve in a 4 m long tube with a diameter of 4 mm, whereby the pressure falls to standard pressure. The polyamide melt emerging from the tube is then cooled in water and granulated. The granulate has a relative viscosity of 2.1 measured on a 1% solution in m-cresol at 25° C. in a Ubbelohde-Viscosimeter. The polyamide is secondarily condensed discontinuously in the solid phase in a tumble drier over 8 h at 190° C. in a nitrogen flow to a viscosity of 3.5.

The polyamide can be processed at 320° C. to mouldings. It has an impact strength of 110 kJ/m$^2$, a bending strength of 143 MPa and a dimensional stability under heat (Vicat B) of 250° C. The melting maximum (DTA, 2nd heating) is at 295° C.

EXAMPLE 2

According to the process described in Example 1, a low viscosity polyamide with a relative viscosity of 2.1 is produced from an aqueous salt solution consisting of 16.11 parts of terephthalic acid, 1.46 parts of isophthalic acid, 11.22 parts of adipic acid, 22.15 parts of hexamethylene diamine (4.5 mol%, based on the diamine, are contained therein in excess) and 50 parts of water. The secondary condensation in the solid phase yields after 8 hours at 190° C. in a nitrogen flow a copolyamide with a viscosity of 3.3.

EXAMPLE 3

According to the process described in Example 1, a low viscosity polyamide with a relative viscosity of 2.1 is produced from an aqueous salt solution consisting of 16.12 parts of terephthalic acid, 2.93 parts of isophthalic acid, 9.82 parts of adipic acid, 22.18 parts of hexamethylene diamine (5 mol%, based on the diamine, are contained therein in excess) and 50 parts of water. The secondary condensation in the solid phase yields after 8 hours at 190° C. in a nitrogen flow a copolyamide with a relative viscosity of 3.5.

We claim:

1. A process for the production of copolyamide from adipic acid, terephthalic acid, isophthalic acid and hexamethylene diamine having from 30 to 51.5% by weight of units of hexamethylene adipic amide, wherein from 40 to 70% of an aqueous solution of monomers is heated in less than 15 min under a pressure of at least 35 bars to at least 250° C. and the water is distilled off in one or more stages under a pressure of from 1 to 40 bars, whereby a preliminary copolyamide condensation product with a relative viscosity of from 1.2 to 2.5 measured on a 1% solution in m-cresol at 25° C., is obtained the condensation of which is continued in the solid phase.

2. A process as claimed in claim 1, wherein a 45 to 65% aqueous solution of monomers is heated within from 1 to 10 min to from 260° to 360° C.

3. A process as claimed in claim 1, wherein preliminary condensation is carried out up to a relative viscosity of from 1.6 to 2.4.

4. A process as claimed in claim 1, wherein the water is distilled off at pressures of from 1 to 35 bars.

5. A process as claimed in claim 1 for the production of copolyamide containing 30 to 51.5% by weight of units of hexamethylene adipic amide and from 70 to 48.5% by weight of units of hexamethylene terephthalic amide/isophthalic amide units of which from 48.5 to 60% by weight are terephthalic amide units.

* * * * *